United States Patent [19]

Hiestand

[11] Patent Number: 4,645,220
[45] Date of Patent: Feb. 24, 1987

[54] APPARATUS AND METHOD FOR MONITORING THE READINESS FOR OPERATION OF A POWER CHUCK

[75] Inventor: Karl Hiestand, Pfullendorf, Fed. Rep. of Germany

[73] Assignee: SMW Schneider & Weisshaupt GmbH, Fed. Rep. of Germany

[21] Appl. No.: 695,445

[22] Filed: Jan. 28, 1985

[30] Foreign Application Priority Data

Jan. 28, 1984 [DE] Fed. Rep. of Germany ....... 3402988

[51] Int. Cl.$^4$ .............................................. B23B 31/28
[52] U.S. Cl. ..................................... 279/111; 279/1 R
[58] Field of Search ................... 279/1 R, 1 H, 1 ME, 279/110, 111, 1 L, 123, 1 S

[56] References Cited

U.S. PATENT DOCUMENTS

| 4,254,676 | 3/1981 | Wilson | 279/110 |
| 4,387,907 | 6/1983 | Hiestand | 279/111 |
| 4,502,704 | 3/1985 | Jackson | 279/1 R |
| 4,536,000 | 8/1985 | Rohm | 279/123 |

FOREIGN PATENT DOCUMENTS

| 3023413 | 1/1982 | Fed. Rep. of Germany | 279/1 R |
| 3212759 | 10/1983 | Fed. Rep. of Germany | 279/111 |
| 114606 | 9/1981 | Japan | 279/111 |

Primary Examiner—Gil Weidenfeld
Assistant Examiner—Daniel W. Howell
Attorney, Agent, or Firm—McGlew and Tuttle

[57] ABSTRACT

To check the flat or planar clamping of a workpiece in the jaws of a chuck, and/or to measure the respective clamping jaws, a pressure responsive signal transmitter is provided in at least one of the contact surfaces of a clamping jaw 6 or in an elastically deformable zone, which can be electrically coupled to measuring instruments provided outside the chuck body, in order to evaluate the signals. This makes it possible to find out, before starting the operation of a machine tool, whether the workpiece is correctly clamped, and with what clamping force.

6 Claims, 1 Drawing Figure

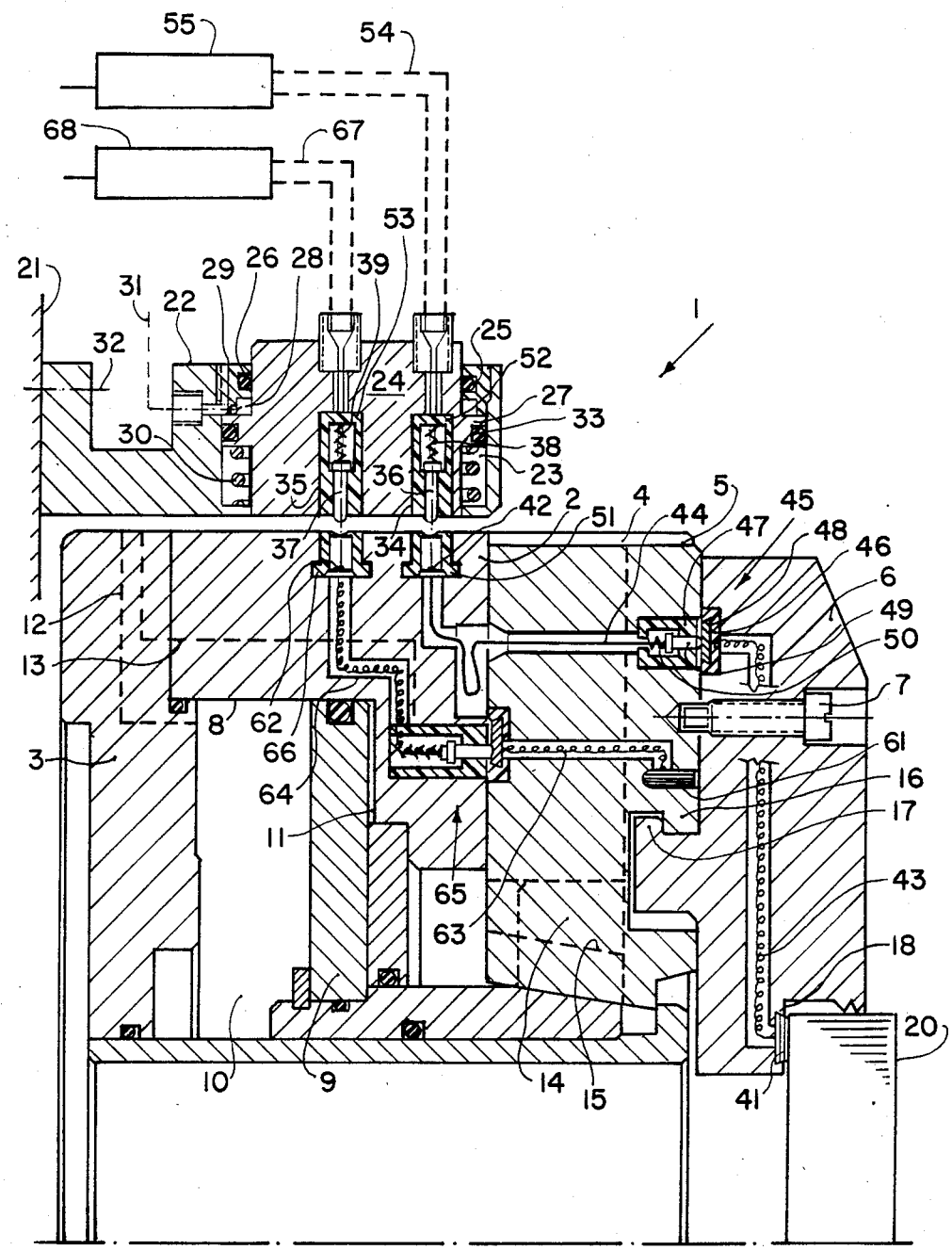

APPARATUS AND METHOD FOR MONITORING THE READINESS FOR OPERATION OF A POWER CHUCK

FIELD AND BACKGROUND OF THE INVENTION

This invention relates in general to chucking devices and in particular to a new and useful apparatus and method for checking the operation readiness of a chuck.

It is known from German OS No. 28 46 337 to equip a power chuck with a device for determining the clamping force from the forces acting on the clamping elements. The device, designed as a detector, comprises a sensor which is disposed in the zone of the clamping surfaces, to directly detect the forces to which the clamping elments are exposed. This is to avoid excessive clamping of a workpiece, intended to counteract any easing of the clamp through centrifugal forces, and to simplify the mechanism for controlling the clamping force.

Details of design of the device and arrangement of the component parts cannot be learned from this prior art disclosure, however, it seems therefore that the clamping force cannot be determined reliably, so that the correct clamping in a chuck can hardly be monitored, especially since nothing is disclosed about how the signals of the sensor are led out of the chuck body.

SUMMARY OF THE INVENTION

The present invention is directed to an arrangement permitting the reliable determination particularly prior to starting an operation of the machine tool, whether the clamped workpiece flatly applies against the respective contact surface, and/or what the actual clamping force is. At the same time, the construction is to be inexpensive, the handling simple, and primarily, monitoring or checking of all substantial functions of the chuck, particularly at standstill, must be easy, without causing difficulty.

In accordance with the invention, an apparatus for measuring the planar clamping of a workpiece comprises a chuck body which has a radially extending groove with at least one clamping jaw movable in the groove. The jaw is moved by displacement of a piston which is keyed thereto. In accordance with the invention, at least one electrical signal transmitter is located between the jaw and workpiece. An electrical signal transmitter in the form of a connecting wire extends through a bore of the chuck body and the jaw to the point at which the jaw contacts the workpiece at which place is located a signal transmitter. The signal transmitter senses the engagement of the jaw with it and this information is related through the transmission lines disposed in the bores of the jaw in the chuck body which are connectable to measuring devices through engagement of a movable piston containing a connecting element to the measuring devices. The construction is usable both with a single master jaw as well with a supplemental jaw associated with the master jaw. In this latter case signal transmission lines extend through the bores of each of the jaws to the workpiece. In addition to the signal transmitter which is located at the workpiece an additional signal transmitter may be located between the jaws preferably adjacent the area where the jaws are somewhat flexible. The system senses alignment of the jaws together as well as the alignment of the jaws with the workpiece.

The inventive arrangement is not only simple in construction but also inexpensive, very reliable in operation, and suitable for checking the safe workpiece clamping at any time. That is, if a pressure responsive signal transmitter is provided in at least one contact surface and/or elastic zone of a clamping jaw, and the signals are evaluated in measuring devices, it can easily be determined whether or not the workpiece is clamped in the chuck correctly and with a satisfactory clamping force. Further, since such a checking is effected advantageously with the chuck body at standstill, no side effects occur which have to be corrected. Another advantages is that the inventive arrangement does not require additional space in the chuck. The signal transmitters and the electrical lines may rather be accommodated without any difficulty in the chuck body and the clamping jaws, and the spindle space is not obstructed by connection lines.

Accordingly, it is an object of the invention to provide an improved electrical transmission system for sensing the alignment of a clamping jaw of a chucking mechanism with the workpiece.

A further object of the invention is to provide an improved construction of a power chuck in which a jaw is movable in a groove of a chuck body and is driven by a power drive in the form of a piston and in which one or more jaws are provided which have transmission lines for a signal transmitter which engages between the workpiece contacting jaw and the workpiece.

A further object of the invention is to provide means for simply and easily connecting a chuck to measuring devices through a signal transmitting system extending through the chuck body in the clamping jaws to the workpiece.

A further object of the invention is to provide a power chuck which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

BRIEF DESCRIPTION OF THE DRAWING

The only FIGURE of the drawing is a schematic sectional view of a power chuck constructed in accordance with the invention.

DESCRIPTION OF THE PREFERRED EMBODIMENT

Referring to the drawing in particular the invention embodied therein comprises an apparatus for measuring the planar clamping of a workpiece which comprises a chuck body 2 having a radially extending groove 4 with at least one clamping jaw 5 movable in the groove 4. Drive means are associated with the body 2 and comprises a piston 9 which is displaceable to move the master jaw 5 which is keyed thereto through taper elements 14. In accordance with the invention, an electrical signal transmitter is disposed between the jaw and the workpiece. In addition, a signal transmission and evaluating means including connecting wires 44 and a measuring device 55 extend from the signal transmitter 41 which is engaged with the workpiece 20 to the exterior of the chuck body 2. The signal transmission and evaluating means includes a measuring device 55 connected through connecting lines on the exterior of the chuck body to connecting lines 44 and that extend through the chuck body and the clamping jaw or jaws.

A power chuck 1 as shown, substantially comprises a chuck body 2 which is closed at its rear by a cover 3, and master jaws 5 which are guided for displacement in one or more radially extending grooves 4 and engaged by a nose 16 behind a shoulder 17 of clamping jaws 6. By means of screws 7 clamping jaws 6 are fixed to master jaws 5.

Master jaws 5 are movable by means of a piston 9 which is received in a cylinder space 8 and positively engaged through taper elements 14 in wedge grooves 15 which are provided in master jaws 5. If pressure fluid is supplied through conduits 12 or 13 which are indicated in broken lines, into one of spaces 10 or 11 to build up a pressure, piston 9 is moved to the right or left. Through operating elements 14 and 15, the axial movement of piston 9 is transformed into a radial movement of clamping jaws 6 outwardly or inwardly, so that the workpiece is disengaged or clamped.

To determine whether a clamped workpiece 20 flatly applies against it, i.e.. is in planar engagement with a contact surface 18 of clamping jaws 6, a signal transmitter 41 in the form of a piezoelectric element is inserted in one of clamping jaws 6, by which an electrical signal is delivered as soon as a pressure is exerted. Since signal transmitter 41 is connected through a line 43 extending within clamping jaws 6 and a line 44 extending within master jaw 5 and chuck body 2 to a contact 42 which is electrically connectable to a measuring device 55, it may easily be learned from the signal whether workpiece 20 applies correctly.

Another signal transmitter 61 is provided in the master jaws 5 in the vicinity of a nose 16 forming an elastically deformable zone. This signal transmitter again is connected through a line 63, an electrical coupling 65, and a line 64 to a contact 62 which in turn is connectable to another measuring device 68. The deformation of the elastic nose 16 of master jaw 5 is a measure of the clamping force exerted on workpiece 20. Transmitter 61, like transmitter 41, may be a piezoelectric element.

Couplings 45 or 65 between lines 43 and 44, or 63 and 64, are formed by a contact bar 48 and a contact pin 49 which is urged by a spring 50 against bar 48. Both bars 48 and pins 49 are received in insulating inserts 46, 47, of course.

To establish through lines 54 and 67, and preferably with chuck body 2 at standstill, an electrical connection between measuring devices 55, 68 and signal transmitters 41, 61 a displacement piston 24 is received in a bore 23 of a holder 22 which is secured with screws 52 to a wall 21. By means of a ring 25 carrying a packing 26, and a return spring 30, piston 24 is held in an upper end position. However, if in a predetermined position, preferably with chuck 1 at standstill, pressure fluid is supplied through a line 31 into space 28 at piston 24 to act against piston surface 29 which is formed by a flange 27 again carrying a packing 33, piston 24 is displaced in the direction of chuck 1. The electrical connection is thereby easily established, since piston 24 carries contacts which are formed by pins 36, 37 received in insulating bushings 52, 53 and located opposite to the contacts provided in the chuck body.

Bushings 52, 53 are inserted in bores 35 of piston 24. To press pins 36, 37 against contacts 42, 62 of the chuck body, which are also received in insulating bushings 51, 66 and thus ensure a delivery of signals from signal transmitters 41, 61, the pins are biased by springs 38, 39.

While a specific embodiment of the invention has been shown and described in detail to illustrate the application of the principles of the invention, it will be understood that the invention may be embodied otherwise without departing from such principles.

What is claimed is:

1. Apparatus for measuring the planar clamping of a workpiece having a radial surface and for rotation about an axis, comprising a chuck body having a radially extending groove and for rotation about the axis, at least one clamping jaw movable in said groove, means associated with said chuck body for driving said clamping jaw, at least one electrical signal transmitter mounted on said jaw for engaging the radial surface of the workpiece, and signal transmission and evaluating means extending from said signal transmitter to the exterior of said chuck body through said clamping jaw and said chuck body for evaluating the engagement of said signal transmitter on the radial surface of the workpiece, said signal transmission and evaluating means including a measuring device on the exterior of said chuck body, a piston on the exterior of said chuck body, means mounting said piston for movement toward and away from said chuck body, said piston being connected to said measuring device and being movable to engage said chuck body, one of said piston and said chuck body having contact pin means and the other of said piston and chuck body having contact bar means and spring means urging said contact pin means toward said bar means, said pin means and said bar means being interengageable against the force of the spring means when said piston is moved into engagement with said chuck body for completing a circuit between said measuring device and said electrical signal transmitter.

2. Apparatus of claim 1, including a fixed holder, said piston being displaceable in said holder, a return spring acting on said piston and urging in a direction away from said chuck body, and means to pressurize one side of said piston so as to force it towards said chuck body.

3. Apparatus of claim 1, wherein said signal transmitter is a pressure responsive member in the form of a piezoelectric element.

4. Apparatus of claim 1, including a master jaw carried by said chuck body and an additional jaw clamped to said master jaw, including a second electrical signal transmitter disposed between said master jaw and said additional jaw, said signal transmission and evaluating means including second contact pin means carried by one of said jaws, second spring means urging said second pin means toward the other of said jaws and second contact bar means carried by the other of said jaws, and electrical transmission cable means connected from said second contact pin means to the exterior of said chuck body and from said second contact bar means to said second signal transmitter.

5. Apparatus of claim 4, including insulating means correspondingly surrounding said contact pin means and said contact bar means, said cable means being flexible and extending through said jaws and said chuck body.

6. Apparatus for preliminarily measuring the planar clamping of and clamping force on a workpiece having a radial surface when such workpiece is clamped by the apparatus for subsequent rotation about an axis, comprising:

a chuck body having a radially extending groove and arranged for rotation about the axis, jaw means movable in the groove, and means associated with the chuck body for driving the jaws means, a first electrical signal transmitter mounted on the jaw means for engaging the radial surface of the workpiece, and first signal transmission and evaluating means extending from the first transmitter to the exterior of the chuck body through the jaw means and chuck body for evaluating the engagement of the first transmitter on the radial surface of the workpiece, the first transmission and evaluating means including a first measuring device on the exterior of the chuck body, a piston on the exterior of the chuck body, and means mounting the piston for movement toward and away from the chuck body, the piston being connected to the first measuring device and being movable to engage the chuck body, one of said piston and said chuck body having first contact pin means and the other of said piston and said chuck body having first contact bar means, and first spring means urging said first contact pin means toward said first bar means, said first pin means and said first bar means being interengageable against the force of said first spring means when said piston is moved into engagement with said chuck body for completing a first circuit between the first measuring device and the first transmitter, a second electrical signal transmitter operatively disposed on the jaw means for sensing the clamping force of the jaw means on the workpiece when the workpiece is clamped thereby, second signal transmission and evaluating means extending from the second transmitter to the exterior of the chuck body through the jaw means and chuck body for evaluating the clamping force of the jaw means on the workpiece sensed by the second transmitter, the second transmission and evaluating means including a second measuring device on the exterior of the chuck body, the piston being further connected to the second measuring device, one of said piston and said chuck body further having second contact pin means and the other of said piston and said chuck body further having second contact bar means, and second spring means urging said second contact pin means toward said second bar means, said second pin means and said second bar means also being interengageable against the force of said second spring means when said piston is moved into said engagement with the chuck body for also completing a second circuit between the second measuring device and the second transmitter, whereby prior to rotation of the workpiece about the axis the piston may be moved into engagement with the chuck body for preliminarily measuring the planar clamping of the workpiece by the jaw means using the first circuit and also for preliminarily measuring the clamping force of the jaw means on the workpiece using the second circuit, and upon achieving proper planar clamping and proper clamping force condition, the piston may be moved out of engagement with the chuck body and such rotation then initiated.

* * * * *